Aug. 10, 1926.

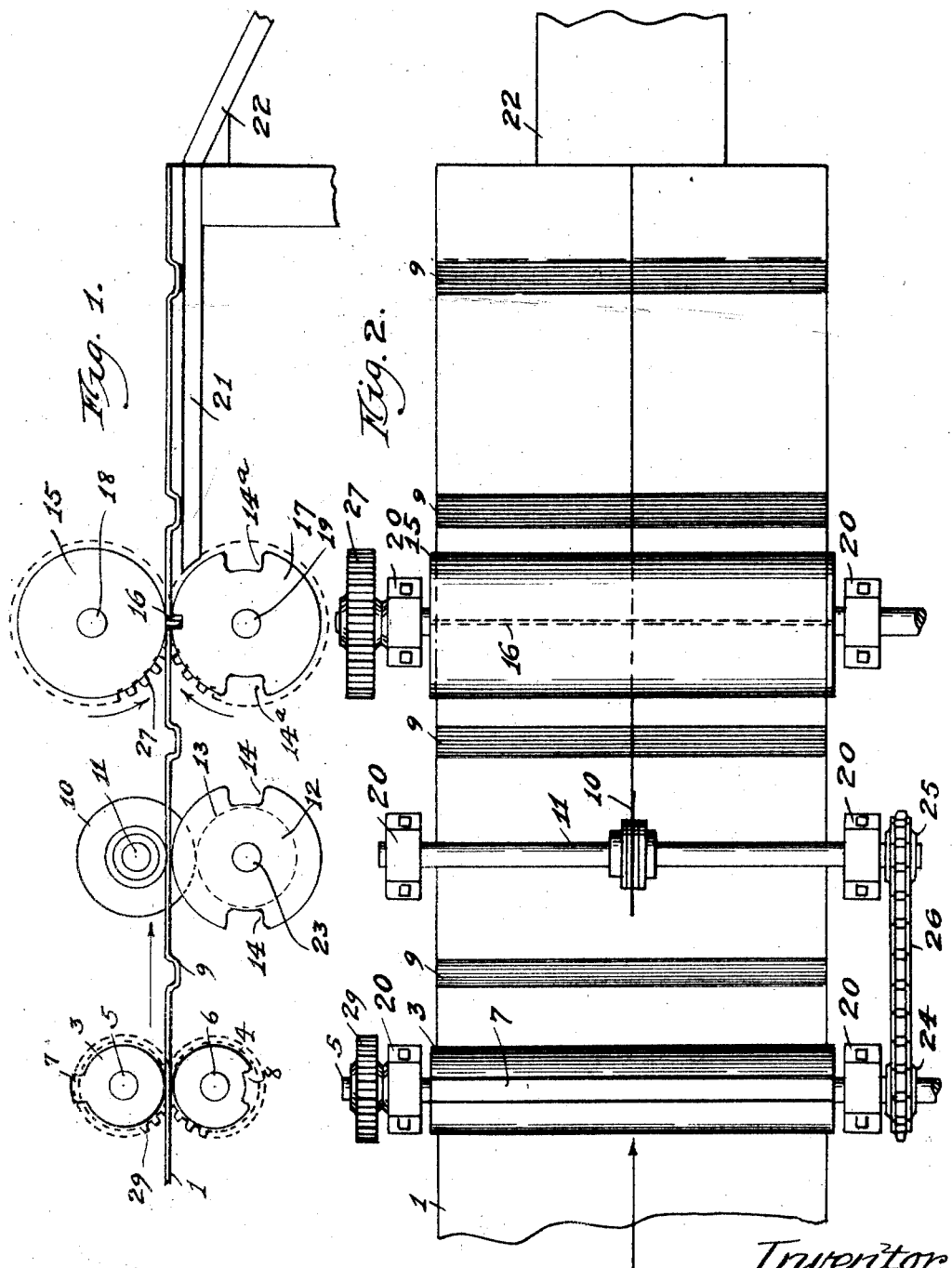

R. T. POLLOCK 1,595,243

MACHINE FOR MAKING ROOFING PRODUCT

Filed Dec. 15, 1919      2 Sheets-Sheet 2

Witness;
S. Mann

Inventor;
Robert T. Pollock
By Frank L. Belknap, Atty.

Patented Aug. 10, 1926.

1,595,243

UNITED STATES PATENT OFFICE.

ROBERT T. POLLOCK, OF BOSTON, MASSACHUSETTS, ASSIGNOR TO FLINTKOTE COMPANY, OF BOSTON, MASSACHUSETTS, A CORPORATION OF MASSACHUSETTS.

MACHINE FOR MAKING ROOFING PRODUCT.

Application filed December 15, 1919. Serial No. 344,966.

My invention relates to a roofing machine and refers more particularly to a machine for impressing embossments in sheet roofing which is afterwards cut into suitable roofing elements.

Among its salient objects are to provide a machine for embossing roofing material which has been saturated or coated with either asphaltic, bituminous or like substances and may or may not have been granular surfaced; to provide a machine that will produce embossments either longitudinally or transversely of the sheet so that convenient roofing elements may be formed by severing the sheet; to provide a machine for making embossed roofing shingles which are more ornamental when laid upon the roof and have the appearance of tile or the like, and due to the embossed portions, the shingles when laid are more resistant to the weathering and warping effects of the elements; to provide a machine which both embosses the roofing and cuts it in a suitable manner for applying it to the roof and in general to provide a product and machine of the character referred to.

In the drawings:—

Fig. 1 is a diagrammatic side elevation of a roofing machine for producing transverse bosses upon the roofing sheet.

Fig. 2 is a plan view of the machine shown in Fig. 1.

Figure 3:
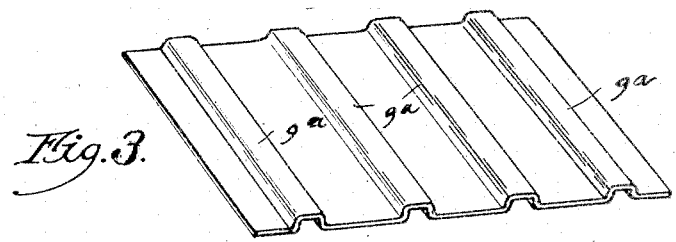
Fig. 3 is a detail view of a shingle unit produced in the machine shown in Fig. 1.

Referring in detail to the drawings, the roofing sheet 1, which is of the usual type of saturated felt or bituminous coated material is fed by any suitable means (not shown) through the embossing rolls 3 and 4 which are mounted upon suitable shafts 5 and 6. A boss 7 running longitudinally of the roll 3 registers with a recess 8 similarly arranged as the boss 7 on the roll 4. The roofing sheet, after passing through these rolls has embossments as that shown at 9 produced transversely across the roofing sheet. A slitter 10 mounted upon a suitable shaft 11 cuts the sheet longitudinally. This slitter has a backing roll 12 which is grooved at 13 to receive the cutting edge of the slitter and has recesses 14, which register with the embossments 9 to prevent the embossments being flattened by the bed roll 12 in the slitting operation. The roofing sheet then passes through the transverse cutting roll 15, which has the cutting blade 16 mounted thereon and which does the transverse cutting in combination with the bed roll 17, similarly recessed as the bed roll 12 at 14ª to prevent flattening of the embossments. The rolls 15 and 17 are mounted on suitable shafts 18 and 19, which in turn are supported by bearings 20.

The roofing units produced by the longitudinal slitting and transverse cutting proceed onto the table 21 and down the chute 22 to any suitable collector (not shown). The shafts 5 and 11, which support the rolls 3 and slitter 10 are mounted in bearings 20, similar to those supporting the shaft 18. The shafts 6, 23 and 19 are similarly mounted in bearings (not shown). The shaft 11 is driven from the shaft 5 by means of sprockets 24 and 25 and the chain 26. Power is transmitted to the bed rolls 17 and 4 from the pressure rolls 15 and 3 through the gears 27 and 29, meshing with similar gears (not shown) on the bed roll shafts. The frame for supporting the bearings has been omitted for clearness. This frame may be of a common type employed in these roofing machines.

Figure 4:
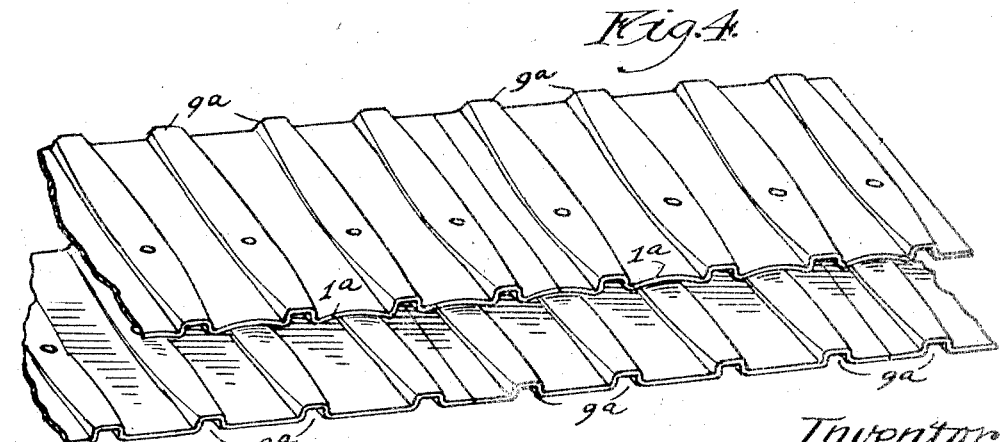
Fig. 4 is a fragmentary detail view of a portion of a roof laid with shingle shown in Fig. 3.

In Fig. 4 is shown a means of laying the roofing so that the embossed portion produced in the roofing sheet may be flattened somewhat in nailing to the roof, thereby allowing the flat portions shown at 1ª, between the two embossements to be drawn down close to the underlying shingle. By laying the roofing in this manner, the appearance will be that of a tile roof and the troughs between the two embossments will be uniformly arranged above the embossed portion of the underlying shingle, producing a very ornamental effect.

The slitting and transverse cutters may be omitted from either type of machine and the roofing sheet fed between the embossing rolls and thereafter made up into the rolls. These rolls, with the embossments impressed thereon may subsequently be cut by any suitable severing means remote from the embossing machine, into roofing elements of a convenient or desired size.

I do not, in any way, wish to limit myself to this mode of laying the roofing shingles but suggest it merely as a means of producing an ornamental effect and at the same time producing a roofing which is less susceptible to the elements.

I claim as my invention:

1. In a roofing machine, the combination with means for feeding a roofing sheet, of circular embossing rolls having continuous parallel substantially angular shaped bosses transversely of the periphery thereof for impressing embossments transversely in the roofing sheet, a rotating element having cutting means disposed longitudinally thereof for severing the sheet into suitable shingle elements, and means registering with the formed embossments to preserve the shape thereof while the sheet is being severed.

2. In a roofing machine, the combination with means for feeding a roofing sheet, of circular embossing rolls having continuous parallel substantially angular shaped bosses transversely of the periphery thereof for impressing embossments transversely in the roofing sheet, rolls having cutting means disposed longitudinally and transversely thereof for severing the sheet into suitable shingle elements, and means registering with the formed embossments to preserve the shape thereof while the sheet is being severed.

3. In a roofing machine, the combination with means for continuously feeding a roofing sheet, rolls having peripheral bosses for impressing continuous ridges having square cornered configurations transversely of the sheet at predetermined intervals, and means for cutting the sheet longitudinally and transversely into suitable shingle elements, and means registering with the formed embossments to preserve their shape while the sheet is being severed.

ROBERT T. POLLOCK.